3,040,421
ADJUSTING TOOL FOR VEHICLE TIE RODS
William F. Race, 118 Laird Drive,
Toronto 17, Ontario, Canada
Filed Feb. 4, 1960, Ser. No. 6,737
1 Claim. (Cl. 29—240)

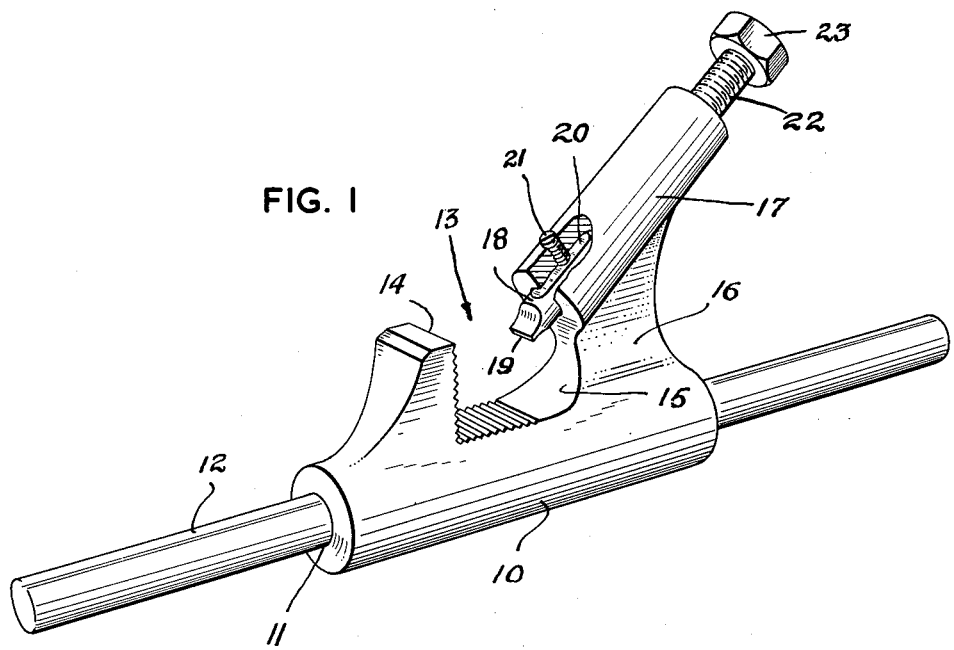
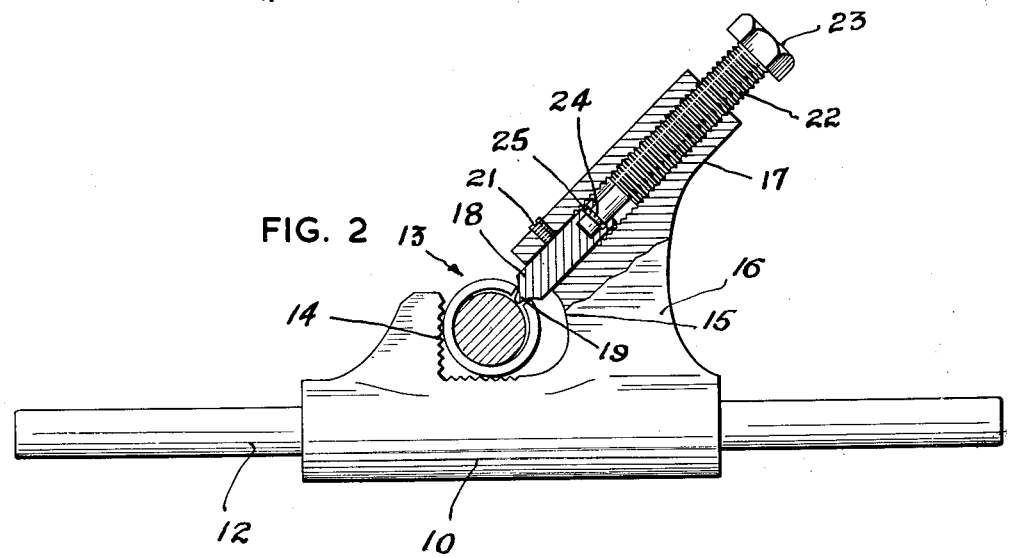

This invention relates to a tool for adjusting tie rods of motor vehicles.

Much difficulty is experienced in adjusting the tie rods of motor vehicles since they are subjected to all kinds of weather during use and wherein the sleeve thereof is subjected to an accumulation of dirt and moisture, including ice and crustation such that when it becomes necessary to adjust or replace the sleeve it often is necessary to use a blow-torch as well as various standard tools to meet requirements and which involves time and trouble as well as cost.

The present invention is directed to a simple tool for making tie rod adjustment which will avoid the difficulties of past practice.

The invention generally comprises a tool body having an enlarged notch therein extending from side to side thereof and forming a fixed jaw, said body including a bore opening at one end on a surface of said notch opposite to and in line with said fixed jaw, a movable jaw slidably carried in said bore and movable to intersect said notch in a direction towards and away from said fixed jaw to clamp and release a sleeve element received in and traversing said notch, means for moving said movable jaw to and from said clamped position, said movable jaw having a projection thereon capable of entering a recess in said sleeve, and handle means on said body for rotating it when said jaws are in clamped engagement with said sleeve element for forcibly rotating the latter relatively to an element to which it is secured.

The invention will be clearly understood be reference to the following detailed specification taken in conjunction with the accompanying drawings, in which FIGURE 1 is a side elevation of the tool according to the present invention;

FIGURE 2 is a longitudinal section taken through the tool of the present invention to illustrate its component parts in co-ordinated relation and also illustrating the sleeve of a tie rod engaged thereby.

Referring to the drawings, the tool generally includes a body 10 preferably having a bore 11 through the base thereof in which a bar or other handle 12 may be inserted to provide for leverage in operation. The body 10 is formed with an enlarged tie rod sleeve receiving notch 13 formed by a serrated fixed jaw 14 on the one hand and the inner wall 15 of a superstructure 16 which rises from the body 10 and carries a sleeve-like or tubular head or element 17 disposed at an incline to the body 10 and to the transverse axis of the notch 13. Within the bore of the element 17 a slidable wedge element 18 is mounted as to project toward the notch 13 and which wedge element is provided with the wedge 19 projecting from its free end. The wedge 19 of wedge element 18 is slidably mounted in head 17 in any suitable way, to constitute a movable jaw, being prevented from rotation in the present showing by a flat face 20 on the wedge shank, engaged by a suitable screw or pin 21 which traverses the bore of head 17. The outer end of bore 17 is screw-threaded to threadedly receive the threaded shank 22 of the adjusting screw 23 which in turn is connected in freely rotatable relation with the shank of the wedge-like element 18 as by a grooved foot 24 adapted to receive ball bearings introduced by means of the transverse passage 25 in the shank of the wedge-like element 18.

In use it is only necessary to dispose the tool so that the adjusting sleeve of the tie rod is received within the recess 13 and to dispose the wedge 19 in line with the split of the sleeve, whereupon by tightening the adjusting screw 23 until the wedge 19 enters the split to the desired degree, thus to open the sleeve sufficiently to release the threads which may be corroded or "frozen" to the sleeve, the latter may be adjusted readily by imposing suitable leverage on the bar 12. The tool can be rotated in either direction and by grasping the handle 12 on each side of the tool substantial leverage can be applied.

What I claim as my invention is:

A tool for removing split tie rod sleeves and the like, comprising a body having an enlarged notch therein of substantially U-shaped form extending from side to side thereof, one arm and the base of said U forming a fixed jaw, the other arm including a bore opening on a surface of said notch opposite to and substantially in line with the juncture of said one arm and base forming said fixed jaw, said body including a tubular base and a tubular head rising at an incline from said tubular base, said inclined tubular head forming said bore, a movable jaw slidably carried in said bore and movable to intersect said notch in a direction towards and away from said fixed jaw adapted to clamp and release a split sleeve element received in and traversing said notch with the split facing said movable jaw, rotatable means for moving said jaw towards and away from said fixed jaw and the sleeve adapted to be engaged thereby, said movable jaw having a chisel-like terminal capable of entering the split in said sleeve, means for maintaining said movable jaw from rotating as it moves towards and away from said fixed jaw, whereby to maintain said chisel-like extremity in position to enter and recede from the split in said sleeve when moved in one direction or the other, and handle means carried by said subular body for rotating it when said jaws are in clamped engagement with said sleeve element for forceably rotataing the latter relatively to an element to which it is secured.

References Cited in the file of this patent
UNITED STATES PATENTS

| | | |
|---|---|---|
| 329,406 | Meadows | Oct. 27, 1885 |
| 1,380,071 | Marzyck | May 31, 1921 |
| 2,352,290 | Saul et al. | June 27, 1944 |
| 2,444,097 | Grant | June 29, 1948 |